US011425362B2

United States Patent
Liu et al.

(10) Patent No.: US 11,425,362 B2
(45) Date of Patent: Aug. 23, 2022

(54) STEREOSCOPIC DISPLAY DEVICE

(71) Applicant: BEIJING SENSETIME TECHNOLOGY DEVELOPMENT CO., LTD., Beijing (CN)

(72) Inventors: Chang Liu, Beijing (CN); Song Cheng, Beijing (CN); Zilong Zhang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/134,612

(22) Filed: Dec. 28, 2020

(65) Prior Publication Data
US 2021/0120226 A1    Apr. 22, 2021

Related U.S. Application Data

(63) Continuation of application No. PCT/CN2020/089236, filed on May 8, 2020.

(30) Foreign Application Priority Data

Aug. 28, 2019   (CN) .......................... 201921418888.5
Dec. 11, 2019   (CN) .......................... 201922219552.2

(51) Int. Cl.
*H04N 13/346* (2018.01)
*H04N 13/302* (2018.01)
*G06F 1/16* (2006.01)

(52) U.S. Cl.
CPC ......... *H04N 13/346* (2018.05); *H04N 13/302* (2018.05); *G06F 1/1605* (2013.01)

(58) Field of Classification Search
CPC ............... H04N 13/346; H04N 13/302; H04N 2213/006; G06F 1/1605; G02B 30/00;
(Continued)

(56) References Cited

U.S. PATENT DOCUMENTS 5,639,151 A * 6/1997 McNelley ............... G03B 15/10
                                                   348/14.07
8,692,738 B2   4/2014 Smithwick
(Continued)

FOREIGN PATENT DOCUMENTS

CN      104935916 A    9/2015
CN      204964982 U    1/2016
(Continued)

OTHER PUBLICATIONS

International Search Report in the international application No. PCT/CN2020/089236, dated Aug. 13, 2020, 2 pgs.
(Continued)

*Primary Examiner* — Tung T Vo
(74) *Attorney, Agent, or Firm* — Cooper Legal Group, LLC

(57) ABSTRACT

A stereoscopic display device includes a case, a transparent display screen and one or more light sources. The case includes a chamber, one side of which is a front plate, the front plate is transparent, the transparent display screen is received inside the chamber and directly faces the front plate, the light sources are arranged inside the chamber and give off light towards the transparent display screen, and a picture displayed on the transparent display screen forms a reflection at the transparent display screen or at a bottom of the chamber.

18 Claims, 11 Drawing Sheets

(58) Field of Classification Search
CPC .......... G02B 30/40; G02B 30/56; G02B 5/02;
G02B 5/08; G09F 19/12
USPC ............................................................ 348/51
See application file for complete search history.

(56) References Cited

U.S. PATENT DOCUMENTS

| | | | |
|---|---|---|---|
| 9,122,448 B2* | 9/2015 | Gao | G06F 1/1632 |
| 9,690,325 B2* | 6/2017 | Mihara | G06F 1/1632 |
| 10,139,721 B1 | 11/2018 | Choi | |
| 10,437,328 B2* | 10/2019 | Nelson | A63F 9/24 |
| 2004/0190234 A1* | 9/2004 | Lin | G06F 1/1683 |
| | | | 361/679.28 |
| 2006/0120034 A1* | 6/2006 | Huang | G06F 1/1601 |
| | | | 361/679.46 |
| 2012/0313839 A1 | 12/2012 | Smithwick | |
| 2015/0146352 A1* | 5/2015 | Yanagisawa | G06F 1/1601 |
| | | | 361/679.01 |
| 2016/0050406 A1* | 2/2016 | Park | G02B 30/40 |
| | | | 348/49 |
| 2016/0223867 A1* | 8/2016 | Kim | G02F 1/133608 |
| 2016/0266543 A1 | 9/2016 | Crowder et al. | |
| 2018/0004039 A1* | 1/2018 | Kim | G02F 1/133615 |
| 2018/0341171 A1 | 11/2018 | Choi | |
| 2021/0200151 A1* | 7/2021 | Bae | G03H 1/22 |

FOREIGN PATENT DOCUMENTS

| | | |
|---|---|---|
| CN | 107533184 A | 1/2018 |
| CN | 108931856 A | 12/2018 |
| CN | 208969353 U | 6/2019 |
| CN | 209231658 U | 8/2019 |
| JP | H06242507 A | 9/1994 |
| JP | H07234645 A | 9/1995 |
| JP | H11227535 A | 8/1999 |
| JP | 2003255876 A | 9/2003 |
| JP | 2010160272 A | 7/2010 |
| JP | 2018042155 A | 3/2018 |
| JP | 2018146965 A | 9/2018 |

OTHER PUBLICATIONS

First Office Action of the Japanese application No. 2020-569777, dated Feb. 22, 2022, 10 pgs.

* cited by examiner

STEREOSCOPIC DISPLAY DEVICE

CROSS-REFERENCE TO RELATED APPLICATION

This application is a continuation of International Application No. PCT/CN2020/089236, filed on May 8, 2020, which claims priority to Chinese Patent Application No. 201921418888.5, filed on Aug. 28, 2019, and Chinese Patent Application No. 201922219552.2, filed on Dec. 11, 2019. The disclosures of International Application No. PCT/CN2020/089236, Chinese Patent Application No. 201921418888.5, and Chinese Patent Application No. 201922219552.2 are hereby incorporated by reference in their entireties.

BACKGROUND

Traditional three-dimensional (3D) display techniques include a technique based on a slit grating, a technique based on a lenticular lens and the like. The technique based on the slit grating is used to control a naked-eye 3D display device and adjust parameters such as distances between viewpoints by determining a width of a transparent strip and a width of a light-blocking strip and determining a distance between a two-dimensional (2D) Liquid Crystal Display (LCD) screen and the slit grating, thereby enabling a viewer to view a stereoscopic parallax image correctly. The technique based on the lenticular lens is similar to the one based on the slit grating because both of the two techniques encode parallax images at different angles on a 2D display panel to make the images appear stereoscopic. The lenticular lens is composed of many cylindrical lenses that have a same structure and are parallel to each other.

However, the traditional 3D display techniques usually involve complicated design schemes and have poor stereoscopic display.

SUMMARY

The disclosure relates to the technical field of stereoscopic display, and particularly to, a stereoscopic display device.

The disclosure provides a stereoscopic device, the device including a case, a transparent display screen and light sources, herein the case includes a chamber, one side of the chamber is a front plate, the front plate is transparent, the transparent display screen is received inside the chamber and directly faces the front plate, the light sources are arranged inside the chamber and give off light towards the transparent display screen, and a picture displayed on the transparent display screen forms a reflection at the transparent display screen or at a bottom of the chamber.

BRIEF DESCRIPTION OF THE DRAWINGS

The accompanying drawings needed by the description of the implementations of the disclosure or the description of the prior art are described below in order to make the technical solutions in the implementations or the prior art described more clearly. Apparently, the accompanying drawings described below are merely some implementations of the disclosure. Those of ordinary skills in the art can also obtain other accompanying drawings according to the accompanying drawings without doing creative works.

DETAILED DESCRIPTION

The technical solutions in the implementations of the disclosure will be described clearly and completely below in combination with the accompanying drawings in the implementations of the disclosure. The implementations to be described are not all of the implementations of disclosure but merely a part of the implementations of the disclosure. All other implementations that those of ordinary skills in the art obtain based on the implementations of the disclosure but without doing creative works fall within the protection scope of the disclosure.

Figure 1:
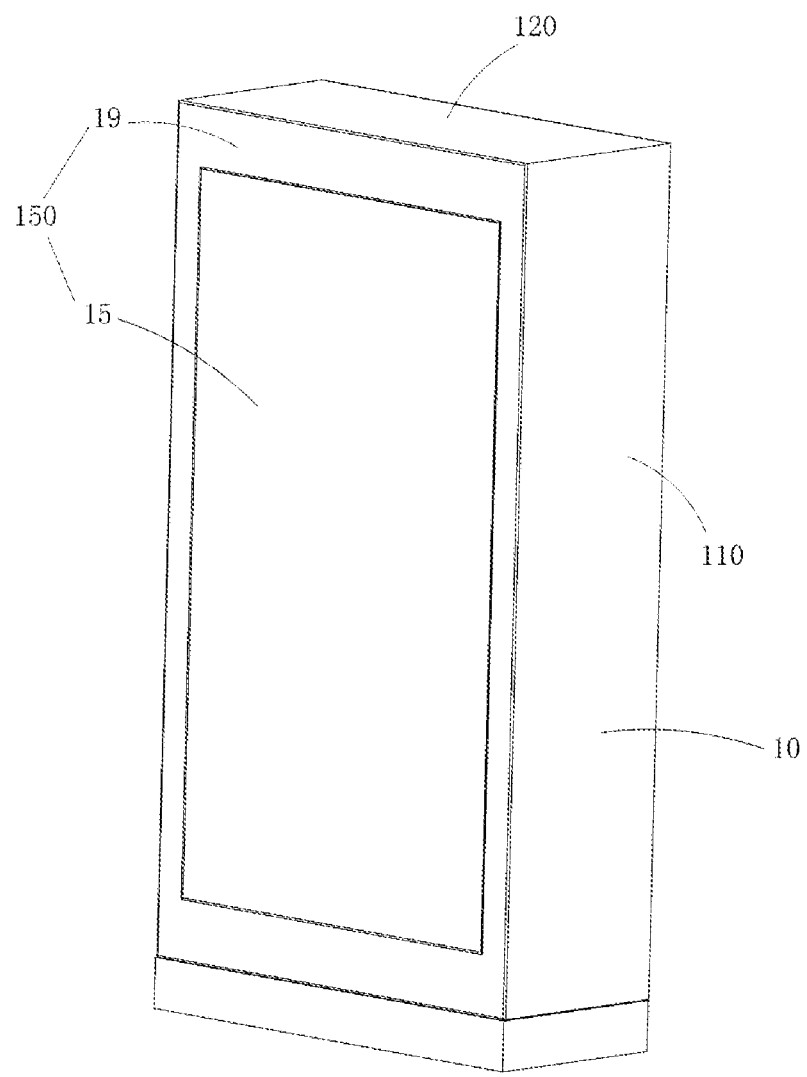
FIG. 1 is a schematic perspective view of a structure of a stereoscopic display device according to an embodiment of the disclosure.

As illustrated in FIG. 1, a stereoscopic display device is provided in the disclosure. The device includes a case 10 that is in the shape of a rectangular solid. Specifically speaking, the case 10 includes a bottom plate (please refer to a reference sign 103 in FIG. 4) and a top plate 120 that are opposite to each other, a front plate 150 and a back plate (please refer to a reference sign 102 in FIG. 6) that are opposite to each other and two opposite side plates 110. A chamber (please refer to a reference sign 101 in FIG. 6) is an area enclosed by the bottom plate, the top plate 120, the front plate 150, the back plate and two side plates 110. In other embodiments, the case 10 is not limited to only two side plates. For example, the case 10 may include 4, 6, 8 or more side plates. Multiple side plates 110 together take a shape of a folded plate. 2, 3 and 4 side plates 110 are respectively on sides of the front plate 150. These numbers of the side plates may be changed and details will not be elaborated herein. Since the case 10 takes a shape of a regular rectangular solid, it is easy to manufacture.

In other embodiments, the case 10 may also take other shapes such as a sphere, an ellipsoid and a truncated cone. The front plate 150 of the case 10 is transparent. Any one or more of the top plate 120, the bottom plate, the back plate and the side plates 110 may be omitted. In other words, the top plate 120, the bottom plate, the back plate and the side plates 110 together constitute a whole plate that can be smoothly connected to the front plate 150 to form a complete and uniform profile. Herein, a shape of the chamber 101 corresponds to that of the case 10. In the embodiment, the case 10 can be in various shapes, be personalized to various needs and bring about many good effects when displayed.

The front plate 150 of the case 10 includes a transparent portion 15 and a frame portion 19 that surrounds the transparent portion 15. The transparent portion 15 is made of transparent materials such as glass, plastic. The transparent portion 15 is in a shape of a rectangle and is slightly smaller than the front plate 150 of the case 10. A length-to-width ratio of the transparent portion 15 may be equal to that of a common video such as 4:3, 16:9, 16:10. An interior structure of the case 10 may be seen through the transparent portion 15. In other embodiments, the transparent portion 15 may be omitted but the entire front plate 150 of the case 10 is made transparent instead, which means both the transparent portion 15 and the frame portion 19 are transparent. In these embodiments, both the portions may be integrated structures. The disclosure aims at arranging a special structure inside the case 10 to implement a stereoscopic display solution that features a simple structure and brings a good display effect.

Figure 2:
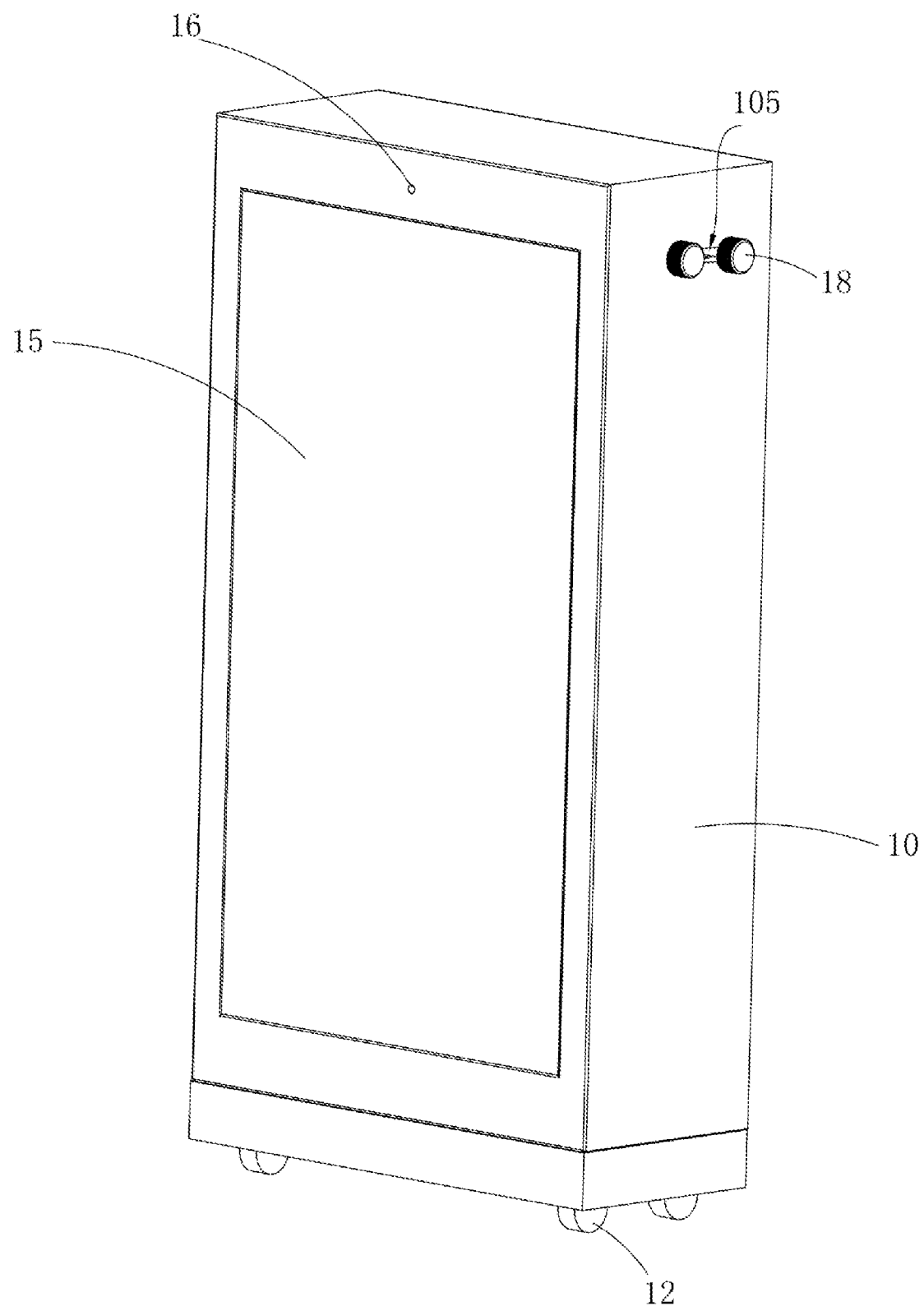
FIG. 2 is a schematic perspective view of a structure of a stereoscopic display device according to another embodiment of the disclosure.

As illustrated in FIG. 2, in an embodiment, multiple mecanum wheels 12 may be arranged at a bottom of the case 10 to underpin and move the case 10. The mecanum wheels 12 may also be redesigned to be ordinary unidirectional wheels.

A camera 16 may be arranged on the case 10. The camera 16 is configured to capture pictures that can be displayed in the interior structure of the case 10. The camera 16 may be arranged at the front plate 150 of the case 10 and at the frame portion 19 that is above the transparent portion 15. The camera 16 may be a camera such as a visible light camera, an infrared camera. Alternatively, multiple cameras 16 may be arranged on the case 10. Certainly, the camera 16 may also be arranged separately as an external device that is connected to the stereoscopic display device.

Figure 3:
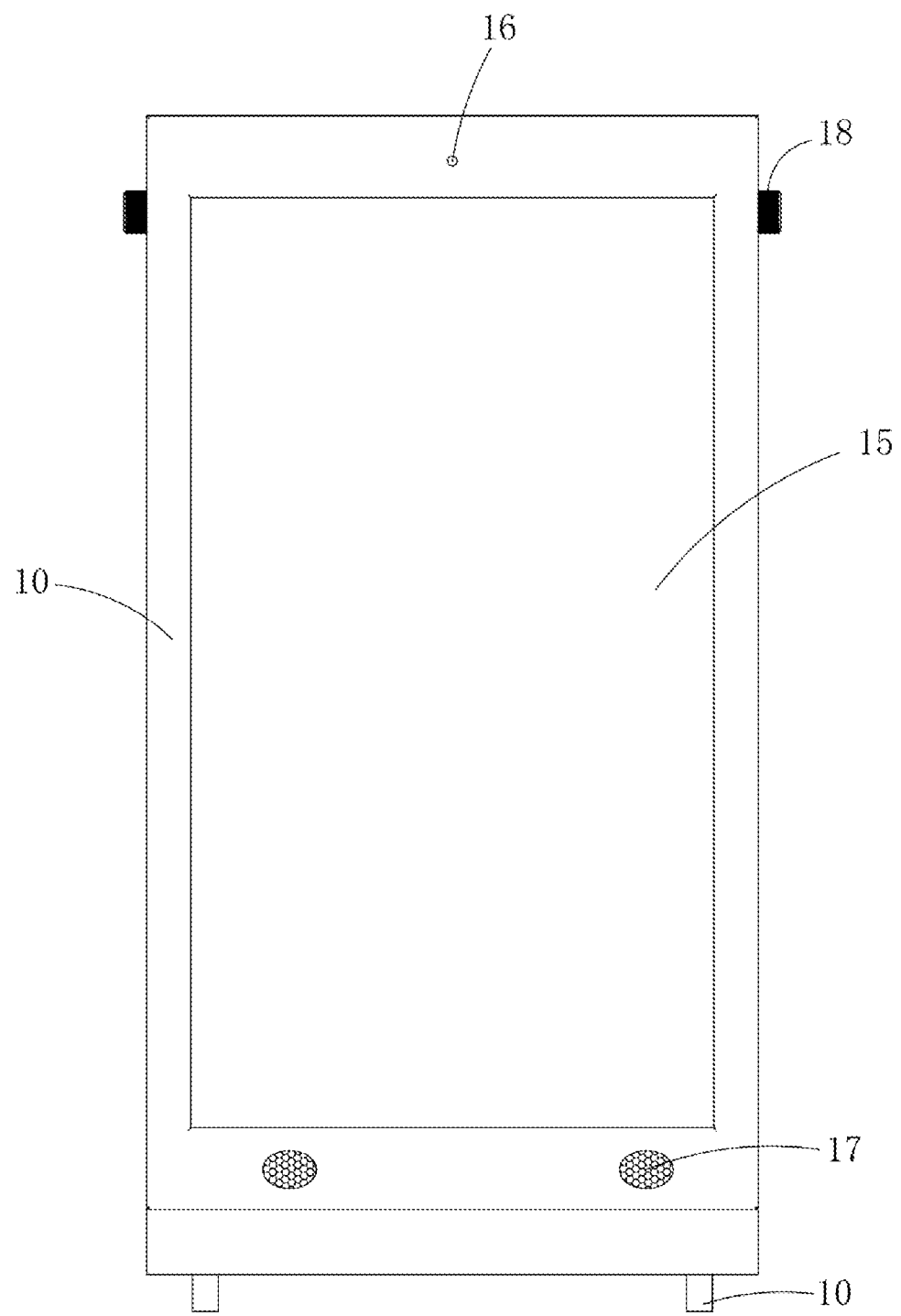
FIG. 3 is a schematic front view of a structure of a stereoscopic display device according to an embodiment of the disclosure.

As illustrated in FIG. 3, loudspeakers 17 may be arranged on the case 10 in the disclosure to play audio. The device may include one or more loudspeakers 17. The loudspeakers 17 may be arranged at the front plate 150 or the side plates 110 of the case 10.

In addition, a microphone or a microphone interface may be arranged on the case 10. Audio information near the case 10 is received through the microphone or a microphone that is externally connected to the microphone interface. The microphone or the microphone interface may be arranged at a position near the loudspeakers 17 so that they make up a whole. Alternatively the microphone or the microphone interface may be arranged at a separate position.

Figure 4:
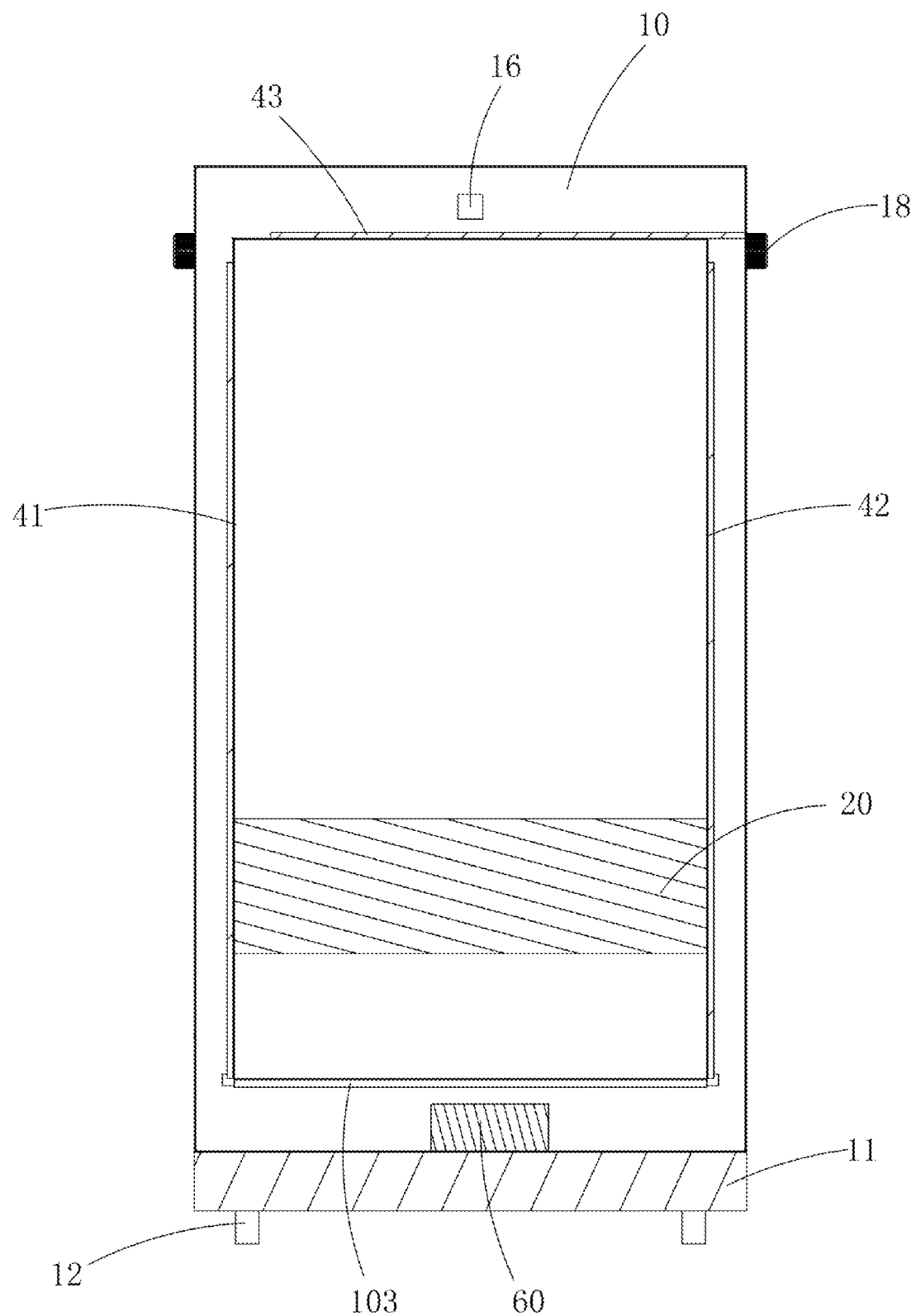
FIG. 4 is a schematic, front and cross-sectional diagram of a structure of a stereoscopic display device according to an embodiment of the disclosure.

As illustrated in FIG. 4, a case bottom 11, a mainboard 60 and the bottom plate 103 are arranged in the case 10. The case bottom 11 is an underpinning of the structure of the case 10 and the mecanum wheels 12 are rotatably connected to the case bottom 11. The bottom plate 103 may be arranged on a side of the case bottom 11 that faces away from the mecanum wheels 12. An accommodating space lies between the case bottom 11 and the bottom plate 103 and the mainboard 60 is arranged in the accommodating space. For example, the mainboard 60 is a Printed Circuit Board (PCB) including chips. The mainboard 60 is configured to provide a source signal to be played to a transparent display screen 20.

As illustrated in FIG. 1 and FIG. 4 again, the transparent display screen 20 is also arranged in the case 10. The transparent display screen 20 directly faces the front plate 150, that is to say, a display surface of the transparent display screen 20 is towards the front plate 150. The transparent display screen 20 is configured to display pictures. The mainboard 60 is electrically connected to the transparent display screen 20. Chips on the mainboard 60 are configured to control display of the pictures on the transparent display screen 20. For example, the transparent display screen 20 is an LCD screen without backlight modules.

Figure 6:
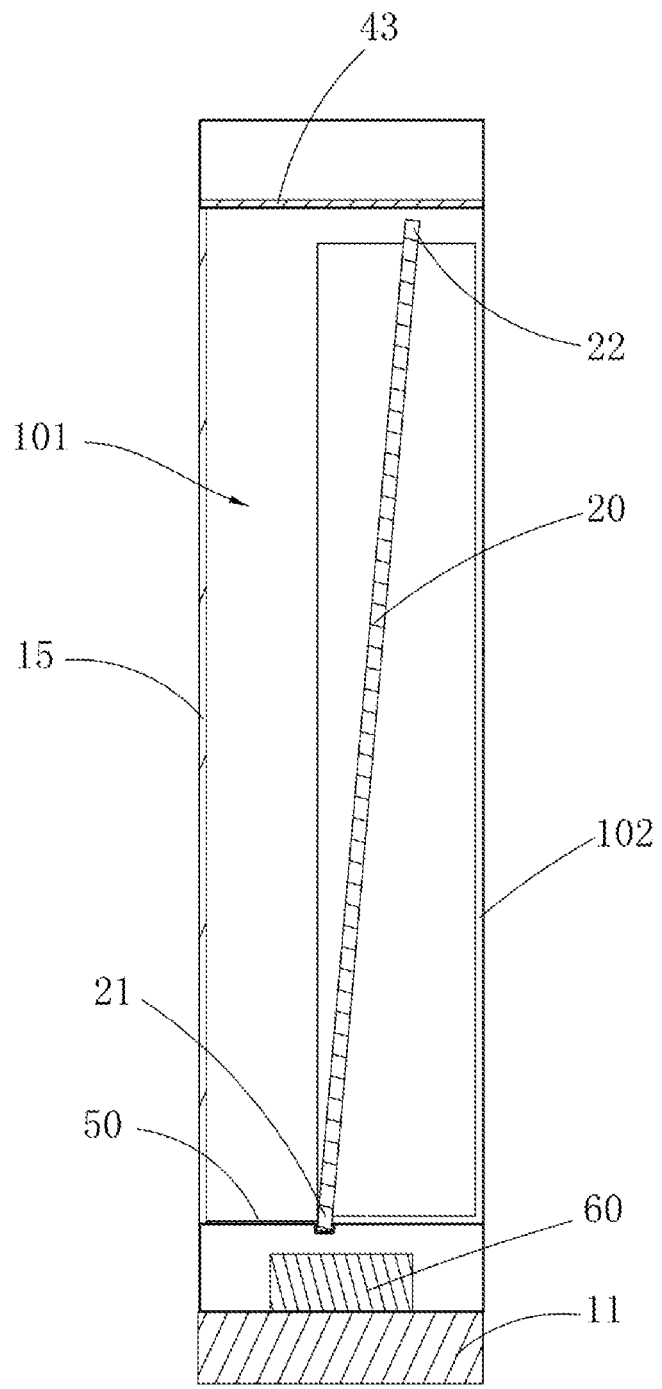
FIG. 6 is a schematic, side and cross-sectional view of a structure of a stereoscopic display device according to an embodiment of the disclosure.

As illustrated in FIG. 6, in an embodiment, the case 10 is in a shape of a rectangular solid and includes a chamber 101 that is also in a shape of a rectangular solid. The transparent display screen 20 is received in the chamber 101. The transparent display screen 20 includes a bottom end 21 and a top end 22 that are opposite to each other. The bottom end 21 is arranged at the bottom plate 103 of the case 10 and the top end 22 is arranged at the top plate 120 or the side plate 110 of the case 10. In other embodiments, when the case 10 is not in the shape of the rectangular solid and in the case 10, for example, the top plate 120 and the bottom plate 103 are not separate plates but constitute an entire plate together with the back plate 102 and the side plates 110, the chamber 101 is in the same shape as the case 10. In these embodiments, the bottom end 21 of the transparent display screen 20 is arranged at a bottom of the chamber 101, the top end 22 is arranged on a top of the chamber 101 and with a curved edge, the transparent display screen 20 is in the same shape as the chamber 101.

The transparent display screen 20 may be at a distance away from the front plate 150. The distance may enable the pictures to give a stronger sense of depth. The transparent display screen 20 may also be arranged at a position next to the front plate 150 to broaden a visible region. The transparent display screen 20 not only provides a viewport for observation but also offers protection for itself.

As illustrated in FIG. 4 and FIG. 6, light sources are arranged in the case 10. The light sources direct light towards the transparent display screen 20. The device may include one or more light sources. For example, a first light source 41, a second light source 42, and a third light source 43 are illustrated in FIG. 4; the first light source 41 and the second light source 42 are arranged opposite each other on two side plates of the case 10 respectively and the light source 43 is arranged on the top plate 110 that is opposite to the bottom plate 103. The case 10 can be provided with 1 or 2 first light sources 41, 1 or 2 second light sources 42 and 1 or 2 third light sources 43.

As illustrated in FIG. 6, the light sources can also be arranged on the back plate 102 of the case 10 in a same way as the first light source 41, the second light source 42 and the third light source 43. A total number of the light sources may be 1, 2, 3 or 4. The light source may be a Light Emitting Diode (LED). The light sources can be arranged to provide backlight to the transparent display screen 20 so that the transparent display screen 20 can display the pictures. Surface light sources are arranged as the light sources to make the light uniform in the chamber 101.

An optional solution to arrange the light sources is: since the back plate 102 directly faces the transparent display screen, a primary light source that provides primary light to the transparent display screen 20 is arranged at the back plate 102, and the first light source 41, the second light source 42 and the third light source 43 are arranged as secondary light sources to increase brightness of the transparent display screen 20.

A stereoscopic display principle of the disclosure is: whether an object seen by human eyes appears stereoscopic is usually determined by its shape and a light-and-shadow effect of the object. For example, the light-and-shadow effect includes specular light and dim light in different areas of the object and a projection (a reflection) of the object on a ground that is produced after the light is cast on the object. Based on the principle, the light sources of the disclosure are made to direct the light towards the transparent display screen 20; after receiving a signal of a stereoscopic video or stereoscopic pictures transmitted by the mainboard 60, the transparent display screen 20 displays the pictures or pictures included in the stereoscopic video; and then the projections of the pictures are formed. In this case, the pictures on the transparent display screen 20 and the reflections of the pictures that collectively appear stereoscopic are able to be seen by the human eyes through the transparent portion 15 at the front plate 150 of the case 10.

In an embodiment, an application causes the reflections to be displayed on the transparent display screen 20; in other words, the transparent display screen 20 displays the pictures included in the stereoscopic video or the stereoscopic pictures as well as the reflections of the pictures so that the human eyes are able to see the stereoscopic pictures.

In another embodiment, as illustrated in FIG. 4 and FIG. 6, the reflections are formed on the bottom plate 103, namely a wall at a bottom of the chamber 101. Since the transparent display screen 20 arranged in the chamber 101 of the case 10 appears transparent and the picture displayed on the transparent display screen 20 is not transparent, after the light emitted by the light sources reach the picture displayed on the transparent display screen 20, a reflection of the picture is formed on the bottom plate 103, which enables the human eyes to see the stereoscopic picture.

Therefore, according to embodiments of the disclosure, by arranging the case 10, the transparent display screen 20 and the light sources in the stereoscopic display device, where the light sources give off light, and the transparent display screen 20 displays the stereoscopic picture and causes the reflection to be formed, it is possible to implement good stereoscopic display with a simple structure.

Figure 7:
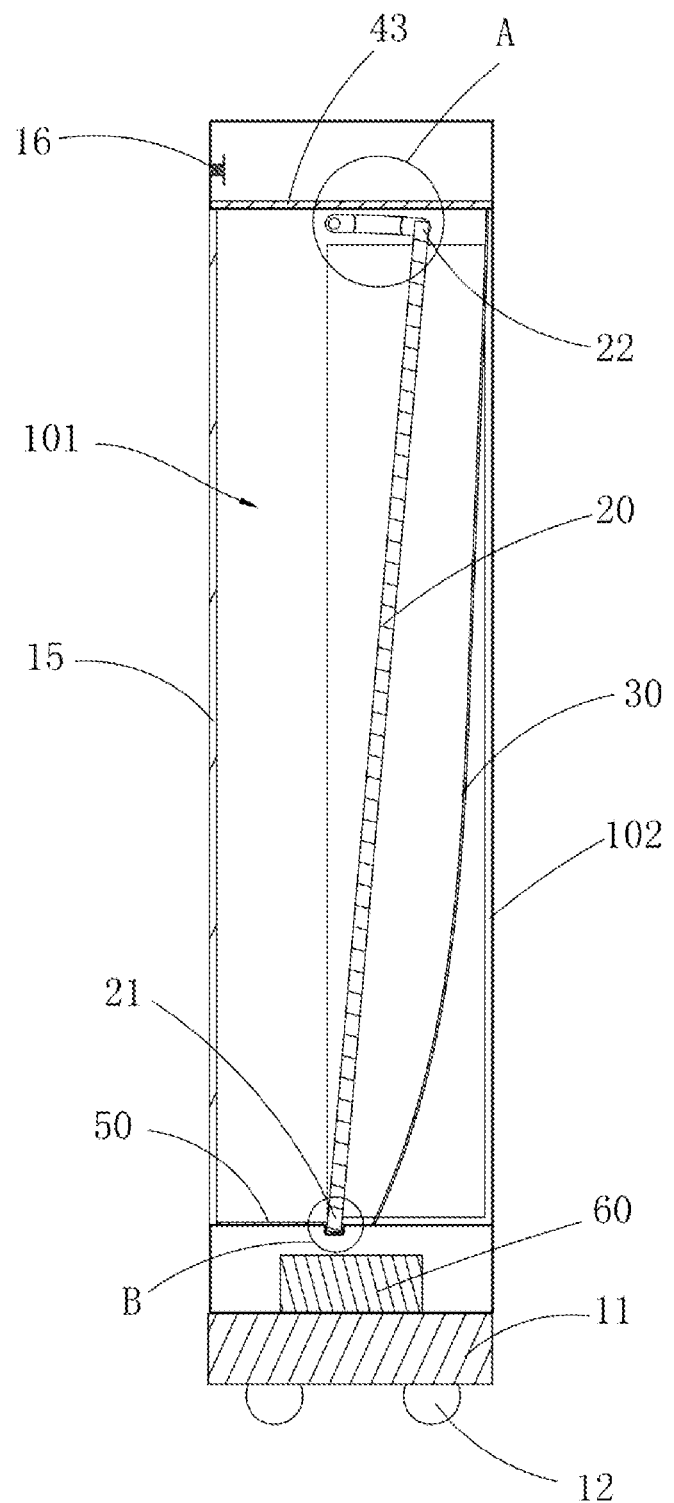
FIG. 7 is a schematic, side and cross-sectional view of a structure of a stereoscopic display device according to another embodiment of the disclosure.
Figure 8:
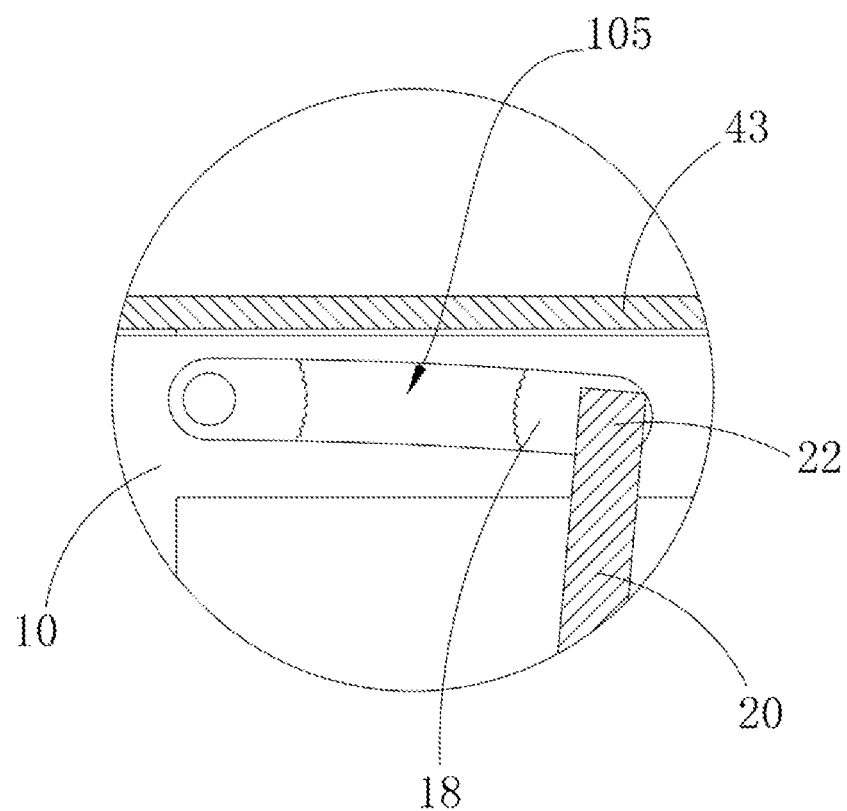
FIG. 8 is schematic partial enlargement view of a structure at a position A in FIG. 7.

In an embodiment, as illustrated in FIG. 7, in some application scenarios, the picture displayed on the transparent display screen 20 is something like an animation including a virtual person; when a person makes a move in front of the case 10, the virtual person on the transparent display screen 20 will make a corresponding move so that human-computer interactions are implemented. A method for implementing the embodiment may be: a processor and a transceiver are arranged on the mainboard 60; the processor and the transceiver may be integrated with chips or arranged separately; for example, the processor is a chip, and the transceiver is a separate device; the processor is configured to obtain at least the image information or the sound information and adjust the picture displayed on the transparent display screen such as animation information of the virtual person based on at least the image information or the sound information.

The transceiver may obtain the image information through the cameras 16 on the case 10 or may receive the image information from a server or other terminal devices. The transceiver may obtain the sound information through the microphone on the case 10 or through an external microphone or may receive the sound information from the server or other terminal devices A method adopted by the processor to adjust the picture displayed on the transparent display screen may be tailored based on a local preset strategy. Alternatively, the processor may also transmit information obtained by the transceiver to the server, and after the server adjusts the information, the processor receives the information fed back by the server.

In an embodiment, as illustrated in FIG. 7, the camera 16 is electrically connected to the processor; the camera 16 is configured to acquire the image information of an environment near the stereoscopic display device and transmit the image information to the processor; the processor is configured to adjust the picture displayed on the transparent display screen 20 such as animation information of the virtual person in response to the image information. Only the structure of the stereoscopic display device can make it possible for the camera 16 to acquire the image information conveniently.

In an embodiment, as illustrated in FIG. 3, the processor is further configured to, during controlling display of a picture (for example, animation information of a virtual person) on the transparent display screen 20, play audio information matching a displayed picture through the loudspeaker 17, which makes the sound in sync with the picture and makes the human-computer interactions effective.

Figure 9:
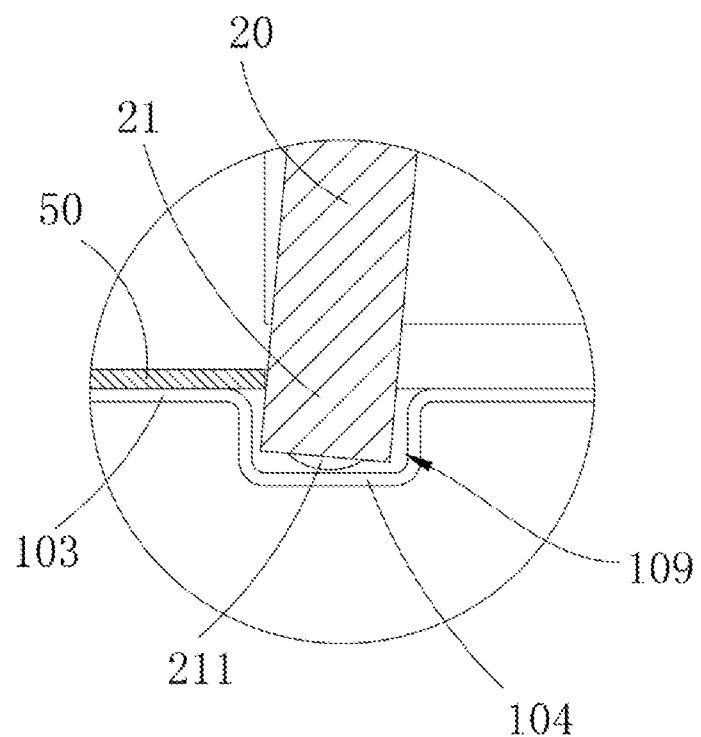
FIG. 9 is schematic partial enlargement view of a structure at a position B in FIG. 7

As illustrated in FIG. 4, FIG. 6 and FIG. 9, in an embodiment, a reflective element 50 is arranged in the chamber 101 and at the bottom plate 103; the reflection of the picture displayed on the transparent display screen 20 is formed at the reflective element 50. For example, the reflective element 50 is a reflective film. The reflective element 50 is able to make the reflection displayed. The picture on the transparent display screen 20 and the reflection of the picture at the reflective element 50 may be seen through the front plate 150 of the case 10 so that the stereoscopic display of the picture is implemented. Compared with the reflection formed on the bottom plate 103, the reflection formed by the arranged reflective element 50 is clearer and has a better stereoscopic effect.

In an embodiment, as illustrated in FIG. 7, a diffusion element 30 is further arranged in the chamber 101 and on a side of the transparent display screen 20 that faces away from the front plate 150 of the case 10. For example, the diffusion element is a diffusion film that may be parallel to the transparent display screen 20 or may be bent. The light sources give off the light from a side of the diffusion element, which faces away from the transparent display screen 20, towards the diffusion element 30. The diffusion element 30 is configured to receive the light from the light sources and direct the light evenly to the transparent display screen 20. The arranged diffusion element 30 is able to direct the uniform light on the transparent display screen 20, making brightness same all over the transparent display screen 20. Therefore, the display of the picture is not affected by the brightness and has a good effect.

As mentioned above, a LCD screen without the backlight modules may be used as the transparent display screen 20 to make the screen appear transparent. Since the picture displayed on the transparent display screen 20 is not transparent, a projection (a reflection) of the picture is able to be formed on the bottom plate 103 or on the reflective element 50. Since the backlight is absent in the transparent display screen 20, the diffusion element 30 is arranged and an external light source directs the light towards the diffusion element 30; then the diffusion element 30 makes the light evenly distributed and directs the light towards the transparent display screen 20; therefore, the transparent display screen 20 is able to display the picture. A finished LCD screen without the backlight modules may be used as the aforementioned LCD screen without the backlight module. Alternatively, an LCD screen without the backlight modules can be ordered from a panel manufacturer and used as the aforementioned LCD screen without the backlight module Since the LCD screen is a mature product, the solution in the disclosure that involves the LCD screen is more convenient than existing 3D display solutions that need to improve the structure of the display screen to implement the stereoscopic display.

In an embodiment, as illustrated in FIG. 6, both the front plate 150 of the case 10 (the transparent portion 15) and the transparent display screen 20 have a flat plate structure; the front plate 150 of the case 10 is perpendicular to the bottom plate 103; the transparent display screen 20 is projected to a first straight line in in an orthographic projection of the side plates of the case 10 and the front plate 150 of the case 10 is projected to a second straight line in the orthographic projection; such design may make the structure of the device simpler compared with complex designs involving a curved surface, an arc-shaped surface or the like.

In other embodiments, the front plate 150 of the case 10 may have a flat plate structure and the transparent display screen 20 may be a curved screen or an arc-shaped screen so that the screen is able to display personalized stereoscopic pictures with a special stereoscopic effect.

Figure 10:
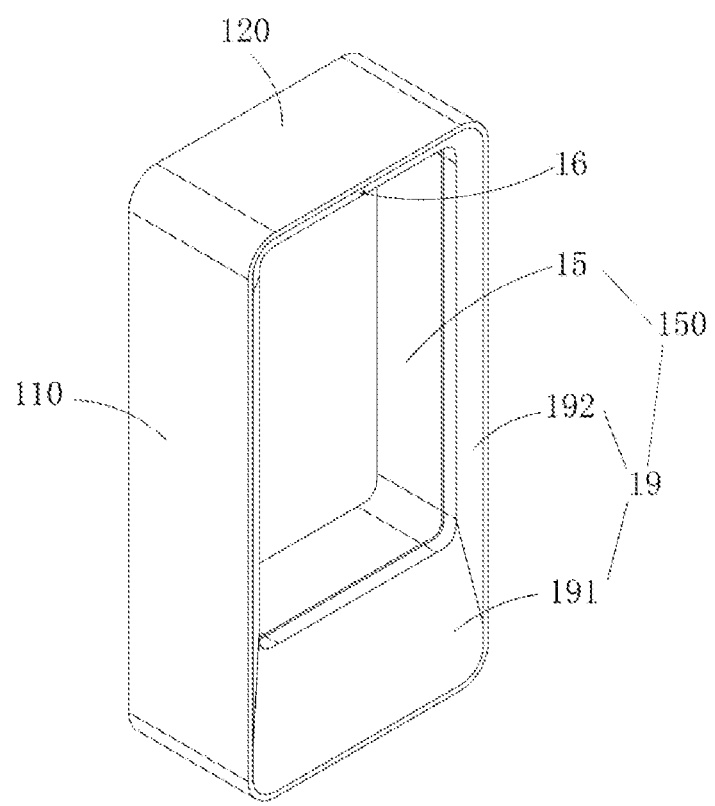
FIG. 10 is a schematic front perspective view of a structure of a stereoscopic display device according to an embodiment of the disclosure.

In an embodiment, as illustrated in FIG. 10, the front plate 150 has a non-flat-plate structure, that is to say, the transparent portion 15 is concaved from the frame portion 19 towards the back plate 102. Viewed from a front of the stereoscopic display device, the front plate 150 has a structure that is concaved in its middle. The frame portion 19 includes a first frame 191 and a second frame 192. The first frame 191 is connected to the bottom plate and the transparent portion 15. Shaped like '☐', the second frame 192 is connected to other 3 side edges of the transparent portion 15 and is in a direction that is perpendicular to an edge of a side plate corresponding to the transparent portion 15. The first frame 191 is wider than the second frame 192, which makes the transparent portion 15 farther from the bottom plate. The transparent portion 15 stays at a great height so that it is easy to see the inside of the case 10 through the transparent portion 15. The concave structure of the transparent portion 15 can also give a stronger sense of depth and brings a better visual effect.

In an embodiment, as illustrated in FIG. 1, FIG. 4 and FIG. 6, the bottom end 21 of the transparent display screen 20 is arranged in a middle of the bottom plate 103, the reflective element 50 is arranged on the bottom plate 103 that is between the front plate 150 (or the transparent portion 15) of the case 10 and the bottom end 21 of the transparent display screen 20. In other words, the reflective element 50 is arranged on a side of the display surface of the transparent display screen 20. Since the display surface of the transparent display screen 20 faces the front plate 150 of the case 10, the reflective element 50 is arranged on the side of the display surface of the transparent display screen 20; therefore, a clear reflection is able to be seen through the front plate of the case 10, which gives a stronger stereoscopic sense.

In an embodiment, as illustrated in FIG. 4 and FIG. 6, a distance between the top end 22 of the transparent display screen 20 and the front plate of the case 10 is not less than a distance between the bottom end 21 and the front plate of the case 10, so that the transparent display screen 20 is perpendicular to or tilted with respect to the bottom plate 103. Like on foregoing embodiment, both the front plate of the case 10 and the transparent display screen 20 in the embodiment have a flat plate structure. In the projection of the side plates, the first straight line makes a first angle with the second straight line. The first angle is an tilt angle of the transparent display screen 20 with respect to the bottom plate 103, and ranges from 0° to 30°. For example, the first angle may be equal to 0°, 2°, 4°, 5°, 7°, 15°, 25°, 27° or any value between 0° to 30°. For another example, the first angle may be 4.5°, 7.8°, 12.1° or like and will not be listed herein. When the first angel is equal to 0°, the transparent display screen 20 is perpendicular to the bottom plate 103 and parallel to the front plate of the case 10, making it easy for the device to assemble. When the first angle is not equal to 0°, the transparent display screen 20 is tilted with respect to the bottom plate 103; in this case, when the transparent display screen 20 displays a picture, all areas in the picture on the transparent display screen 20 are at different distances away from the human eye, which makes the picture observed by the human eye give the sense of depth and becomes more stereoscopic. When the transparent display screen 20 is a curved screen or an arc-shaped screen, the tilt angle is an angle between the front plate of the case 10 and a line connecting the bottom end 21 of the transparent display screen 20 and the top end 22 of the screen.

Figure 5:
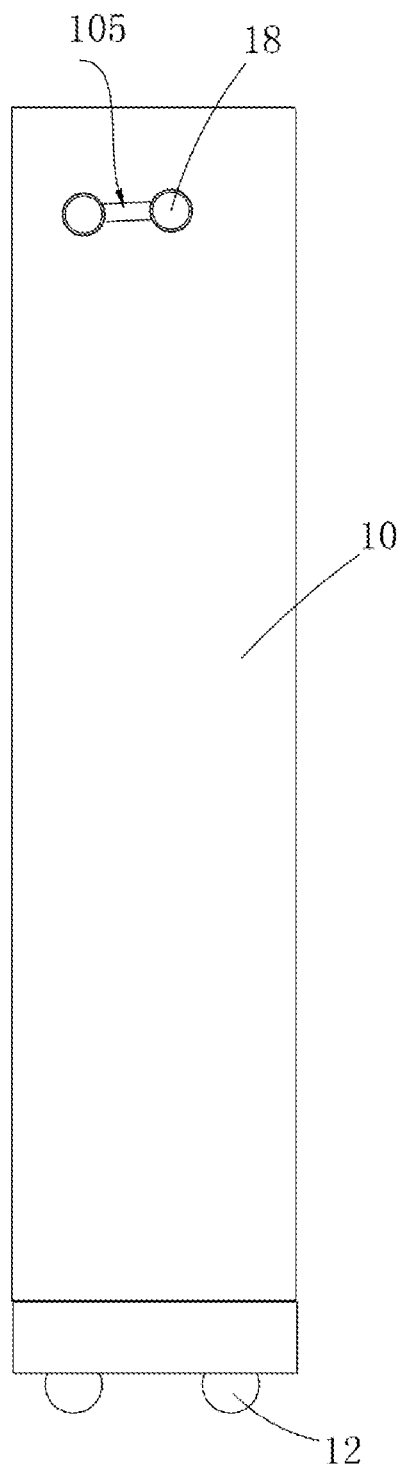
FIG. 5 is a schematic side view of a structure of a stereoscopic display device according to an embodiment of the disclosure.

In an embodiment, as illustrated in FIG. 7 and FIG. 9, the bottom end 21 of the transparent display screen 20 is rotatably connect to the bottom plate 103. As illustrated in FIG. 1 to FIG. 4 and FIG. 6, adjustment elements 18 are arranged on the side plates. As illustrated in FIG. 5 and FIG. 6, the adjustment elements 18 are connected to the top end 22 of the transparent display screen 20. The adjustment elements 18 are configured to cause the top end 22 of the transparent display screen 20 to move towards or away from the front plate of the case 10 to change the first angle.

In other words, in the embodiment, the tilt angle of the transparent display screen 20 with respect to the bottom plate 103 can be adjusted. The adjustment elements adjust the tilt angle of the transparent display screen 20 with respect to the bottom plate 103 during the display of different pictures on the transparent display screen 20 with a view to achieve a better stereoscopic effect.

In other embodiments, the transparent display screen 20 may also be made fixed so that the angle the transparent display screen 20 makes with the bottom plate 103 cannot be changed.

In an embodiment, as illustrated in FIG. 2, FIG. 5 and FIG. 7, a slide groove 105 is arranged on the side plate; the adjustment elements 18 are connected to the top end 22 of the transparent display screen 20 through the slide groove 105. The adjustment elements 18 may be bolts, gears, driving levers or the like. By arranging the slide groove 105, it is possible to implement adjustment of the tilt angle of the transparent display screen 20 outside the case 10, and the adjustment is convenient to be operated.

Here is a detailed example of the adjustment of the tilt angle with a bolt used as an adjustment element 18: a screw rod of the bolt is bolted to the top end 22 of the transparent display screen 20 through the slide groove 105; a nut of the bolt is located on the side plate of the case 10. When the tilt angle of the transparent display screen 20 is required to be adjusted, the nut is turned to rotate the screw rod and loosen the transparent display screen 20; the screw rod is moved in the slide groove 105, which makes the top end 22 of the transparent display screen 20 move accordingly; the bottom end 21 does not move but rotates; after an expected position is reached, the nut and the screw rod are tightened; in this way, the adjustment of the tilt angle of the transparent display screen 20 is achieved. The adjustment elements 18 may be arranged on a side plate on one side of the case 10 or on two side plates that are opposite to each other. When being arranged on a side plate on one side, one or more adjustment elements 18 may be arranged. When multiple adjustment elements are arranged, the tilt angle may be adjusted more accurately.

In an embodiment, as illustrated in FIG. 7 and FIG. 9, a groove 109 with an opening facing the top plate is arranged on the bottom plate 103; a curved protrusion 211 is arranged on an end face of the bottom end 21 of the transparent display screen 20, and is received inside the groove 109. When the bottom plate 103 is thick enough, the groove 109 may be dug on the bottom plate 103; when the bottom plate 103 is not thick enough, a bent portion 104 may be punched out at a local position on the bottom plate 103 so that an area surrounded by the bent portion 104 becomes the groove 109. The bottom end 21 of the transparent display screen 20 is made rotatably connected to the bottom plate 20 by both the curved protrusion 211 and the groove 109. Therefore, the device has a simple structure and is easy to assemble and dismantle. In addition, a frame of the transparent display screen 20 may also be received in the groove 109 so that the frame is hidden and cannot be seen from places outside the case 10; in this case, the display has a better effect.

In other embodiments, the groove is not arranged on the bottom plate 103 but some structures such as a rotary shaft may be arranged on the bottom plate 103 to be rotatably connected to the transparent display screen 20.

Figure 11:
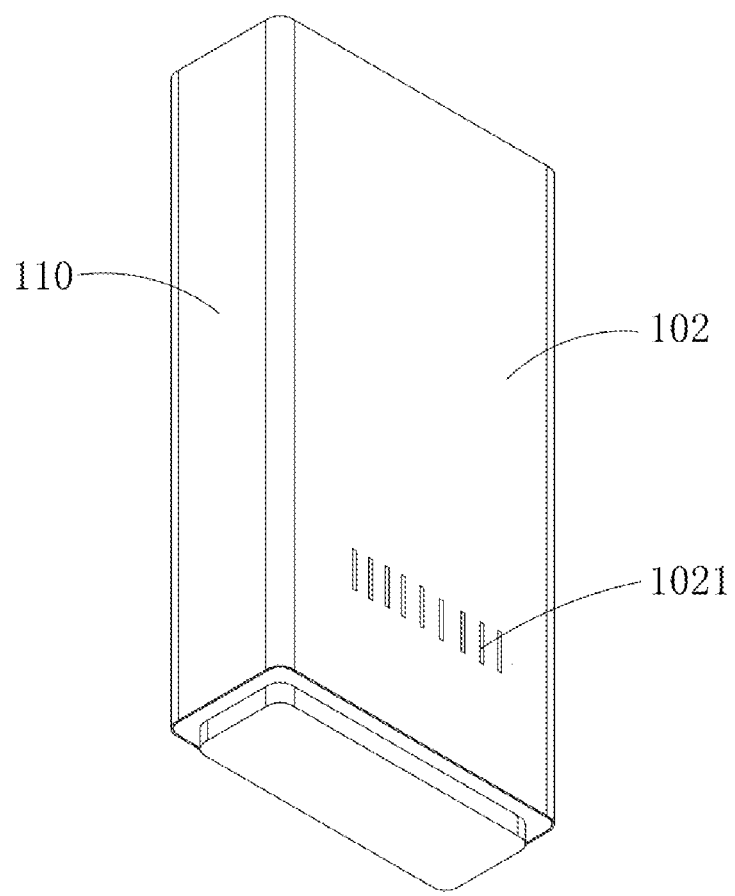
FIG. 11 is a schematic back perspective view of a structure of a stereoscopic display device according to an embodiment of the disclosure.

As illustrated in FIG. 11, in an embodiment, heat-dissipating holes 1021 are further arranged on the back plate 102. A number, a shape of the heat-dissipating holes 1021 and a way that the heat-dissipating holes 1021 are arranged are not limited and will not be elaborated herein. The heat-dissipating holes 1021 are able to dissipate the heat in the case 10 and make the device work in a reliable way. In other embodiments, the heat-dissipating holes may also be arranged on the top plate 120 and the side plates 110.

What are disclosed above are merely some implementations in the disclosure and are not intended to limit a range of the claims in the disclosure. Those of ordinary skills in the art can understand all or a part of processes for implementations. Equivalent changes made according to the claims of the disclosure still fall into the scope of the disclosure.

The invention claimed is:

1. A stereoscopic display device, comprising a case, a transparent display screen, one or more light sources and a diffusion element, wherein the case comprises a chamber, one side of the chamber is a front plate, the front plate is transparent, the transparent display screen is received inside the chamber and directly faces the front plate, the light sources are arranged inside the chamber and give off light towards the transparent display screen, the diffusion element is arranged on a side of the transparent display screen that faces away from the front plate, the light sources give off the light from a side of the diffusion element, which faces away from the transparent display screen, towards the diffusion element, the diffusion element is configured to direct the light evenly to the transparent display screen, a bottom end of the transparent display screen is rotatably connected to a bottom plate of the case, and an adjustment element is arranged on one of one or more side plates of the case, a picture displayed on the transparent display screen forms a reflection at the transparent display screen or at a bottom of the chamber to generate a stereoscopic picture from the picture and the reflection, and the adjustment element is connected to a top end of the transparent display screen and is configured to cause the top end of the transparent display screen to move towards or away from the front plate to adjust a tilt angle.

2. The stereoscopic display device of claim 1, wherein the case comprises the bottom plate and a top plate that are opposite to each other, the front plate and a back plate that are opposite to each other, and the side plates, wherein the chamber is an area enclosed by the bottom plate, the top plate, the front plate, the back plate and the side plates, the transparent display screen comprises the bottom end and the top end that are opposite to each other, the bottom end is arranged at the bottom plate, the top end is arranged at the top plate or one of the side plates, and the picture displayed on the transparent display screen forms the reflection on the transparent display screen or on the bottom plate.

3. The stereoscopic display device of claim 2, wherein the front plate comprises a transparent portion and a frame portion, the transparent portion is surrounded by the frame portion, the frame portion is respectively connected to the top plate, the bottom plate and two of the side plates, and the transparent portion is concaved from the frame portion towards the back plate.

4. The stereoscopic display device of claim 3, wherein the light sources are arranged on any one or more of: the top plate, the back plate and two of the side plates.

5. The stereoscopic display device of claim 3, wherein a distance between the top end of the transparent display screen and the front plate is not less than a distance between the bottom end of the transparent display screen and the front plate, so that the transparent display screen is perpendicular to or tilted with respect to the bottom plate.

6. The stereoscopic display device of claim 5, wherein the tilt angle of the transparent display screen with respect to the bottom plate is an angle between 0° and 30°.

7. The stereoscopic display device of claim 2, wherein a distance between the top end of the transparent display screen and the front plate is not less than a distance between the bottom end of the transparent display screen and the front plate, so that the transparent display screen is perpendicular to or tilted with respect to the bottom plate.

8. The stereoscopic display device of claim 7, wherein the tilt angle of the transparent display screen with respect to the bottom plate is an angle between 0° and 30°.

9. The stereoscopic display device of claim 2, wherein the light sources are arranged on any one or more of: the top plate, the back plate and two of the side plates.

10. The stereoscopic display device of claim 2, wherein heat-dissipating holes are arranged on any one or more of: the top plate, the back plate and two of the side plates.

11. The stereoscopic display device of claim 2, further comprising a reflective element, wherein the reflective element is arranged at the bottom plate, and the picture displayed on the transparent display screen forms a reflection on the reflective element.

12. The stereoscopic display device of claim 11, wherein the bottom end of the transparent display screen is arranged in a middle of the bottom plate, and the reflective element is arranged on the bottom plate between the front plate and the bottom end of the transparent display screen.

13. The stereoscopic display device of claim 1, wherein a slide groove is arranged on the one of the side plates and the adjustment element is connected to the top end of the transparent display screen through the slide groove.

14. The stereoscopic display device of claim 1, wherein a groove is arranged on the bottom plate, an opening of the groove faces the top plate, a curved protrusion is arranged on an end face of the bottom end of the transparent display screen, and the curved protrusion is received inside the groove.

15. The stereoscopic display device of claim 1, wherein the case is provided with a mainboard electrically connected to the transparent display screen.

16. The stereoscopic display device of claim 15, wherein a processor and a transceiver are arranged on the mainboard, wherein the processor is configured to obtain at least one of image information or sound information through the transceiver, and adjust the picture displayed on the transparent display screen based on the at least one of image information or the sound information.

17. The stereoscopic display device of claim 16, wherein a camera is arranged on the case, wherein the camera is electrically connected to the processor and is configured to acquire the image information of an environment near the stereoscopic display device and transmit the image information to the processor, and the processor is configured to adjust the picture displayed on the transparent display screen in response to the image information.

18. The stereoscopic display device of claim 16, wherein one or more loudspeakers are arranged on the case; and
    the processor is further configured to, during controlling display of the picture on the transparent display screen, play audio information matching the picture through the loudspeakers.

* * * * *